(12) United States Patent
Atlas et al.

(10) Patent No.: US 9,571,387 B1
(45) Date of Patent: *Feb. 14, 2017

(54) FORWARDING USING MAXIMALLY REDUNDANT TREES

(71) Applicant: Juniper Networks, Inc., Sunnyvale, CA (US)

(72) Inventors: Alia K. Atlas, Arlington, MA (US); Robert W. Kebler, Newburyport, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/015,613

(22) Filed: Aug. 30, 2013

Related U.S. Application Data

(63) Continuation-in-part of application No. 13/418,212, filed on Mar. 12, 2012, now Pat. No. 8,958,286, and a continuation-in-part of application No. 13/610,520, filed on Sep. 11, 2012, now Pat. No. 9,270,426.

(60) Provisional application No. 61/846,999, filed on Jul. 16, 2013.

(51) Int. Cl.
  *H04L 12/28* (2006.01)
  *H04L 12/723* (2013.01)
(52) U.S. Cl.
  CPC ..................... *H04L 45/50* (2013.01)
(58) Field of Classification Search
  CPC ................................. H04L 12/28; H04L 12/56
  USPC ................ 370/254–256, 389, 408
  See application file for complete search history.

(56) References Cited

U.S. PATENT DOCUMENTS

| | | | | |
|---|---|---|---|---|
| 6,032,194 A | * | 2/2000 | Gai | ........................ H04L 12/462 340/2.1 |
| 6,556,541 B1 | * | 4/2003 | Bare | ...................... H04L 12/185 370/235 |
| 6,721,275 B1 | * | 4/2004 | Rodeheffer | ........... H04L 12/462 370/238 |
| 7,821,972 B1 | * | 10/2010 | Finn | ........................ H04L 45/00 370/256 |
| 8,274,989 B1 | | 9/2012 | Allan et al. | |

(Continued)

OTHER PUBLICATIONS

Response to Office Action dated May 22, 2014, from U.S. Appl. No. 13/418,212, filed Aug. 21, 2014, 10 pp.

(Continued)

*Primary Examiner* — Khaled Kassim
*Assistant Examiner* — Berhanu Belete
(74) *Attorney, Agent, or Firm* — Shumaker & Sieffert, P.A.

(57) ABSTRACT

Network devices can use maximally redundant trees (MRTs) for delivering traffic streams across a network, and for transitioning traffic to a new set of MRTs after a topology change, without dropping traffic. The disclosure describes distributed computation of a set of MRTs from one or more ingress devices to one or more egress devices of the network. In one example, network devices in a network compute a set of MRTs, and establish a set of LSPs along the paths of the set of MRTs. After a change to the network topology, convergence sequencing is managed by a central controller, which centrally orchestrates the sequence for moving traffic from being sent on the old MRT paths to being sent on newly computed MRT paths after the controller determines that all new MRT forwarding state has been installed on the network devices.

23 Claims, 4 Drawing Sheets

US 9,571,387 B1

Page 2

(56) References Cited

U.S. PATENT DOCUMENTS

| | | | |
|---|---|---|---|
| 8,351,418 | B2 | 1/2013 | Zhao et al. |
| 8,634,289 | B2* | 1/2014 | Bejerano ............. H04L 12/1877 370/217 |
| 8,861,340 | B1* | 10/2014 | Atlas ....................... H04L 45/28 370/225 |
| 2002/0167898 | A1* | 11/2002 | Thang .................... H04L 45/02 370/216 |
| 2003/0152024 | A1 | 8/2003 | Yang et al. |
| 2004/0105390 | A1* | 6/2004 | Saksio ................... H04L 41/26 370/245 |
| 2004/0190454 | A1* | 9/2004 | Higasiyama ........ H04L 12/4625 370/238 |
| 2004/0252634 | A1* | 12/2004 | Regan .................... H04L 12/56 370/216 |
| 2004/0258409 | A1* | 12/2004 | Sadananda ............. H04L 45/02 398/50 |
| 2005/0036500 | A1* | 2/2005 | Rodeheffer ........... H04L 12/462 370/401 |
| 2005/0073958 | A1* | 4/2005 | Atlas ....................... H04L 45/00 370/238 |
| 2007/0211730 | A1* | 9/2007 | Cuthbert ............. H04L 12/2602 370/395.53 |
| 2008/0031130 | A1 | 2/2008 | Raj et al. |
| 2008/0107027 | A1* | 5/2008 | Allan ...................... H04L 45/02 370/235 |
| 2008/0123524 | A1* | 5/2008 | Vasseur ............... H04L 12/4633 370/228 |
| 2008/0123533 | A1 | 5/2008 | Vasseur et al. |
| 2008/0219272 | A1 | 9/2008 | Novello et al. |
| 2009/0010272 | A1* | 1/2009 | Wijnands et al. ............ 370/408 |
| 2009/0180400 | A1* | 7/2009 | Chiabaut ............... H04L 12/462 370/255 |
| 2009/0185478 | A1 | 7/2009 | Zhang |
| 2009/0219806 | A1* | 9/2009 | Chen et al. .................... 370/219 |
| 2010/0080120 | A1* | 4/2010 | Bejerano et al. ............. 370/228 |
| 2010/0177631 | A1* | 7/2010 | Chen ....................... H04L 45/00 370/221 |
| 2010/0182937 | A1* | 7/2010 | Bellagamba .......... H04L 12/462 370/256 |
| 2010/0271936 | A1* | 10/2010 | Allan .................... H04L 12/462 370/225 |
| 2011/0051727 | A1 | 3/2011 | Cai et al. |
| 2011/0069609 | A1* | 3/2011 | Le Roux ............. H04L 12/1868 370/221 |
| 2011/0158128 | A1* | 6/2011 | Bejerano ............. H04L 12/1877 370/256 |
| 2011/0199891 | A1* | 8/2011 | Chen ............................. 370/218 |
| 2011/0211445 | A1 | 9/2011 | Chen |
| 2011/0286336 | A1* | 11/2011 | Vasseur ................... H04L 45/00 370/238 |
| 2012/0039164 | A1 | 2/2012 | Enyedi et al. |
| 2012/0044837 | A1* | 2/2012 | Ibanez Fernandez |
| 2012/0281524 | A1 | 11/2012 | Farkas |
| 2013/0077475 | A1* | 3/2013 | Enyedi ................... H04L 45/128 370/225 |
| 2013/0089094 | A1* | 4/2013 | Csaszar ................... H04L 45/00 370/390 |
| 2013/0121169 | A1 | 5/2013 | Zhao et al. |
| 2013/0232259 | A1* | 9/2013 | Csaszar et al. ................ 709/224 |
| 2013/0322231 | A1* | 12/2013 | Csaszar .................. H04L 45/16 370/217 |
| 2014/0016457 | A1 | 1/2014 | Enyedi et al. |

OTHER PUBLICATIONS

Office Action from U.S. Appl. No. 13/610,520, dated Nov. 7, 2014, 22 pp.
Response to Office Action dated Nov. 7, 2014, from U.S. Appl. No. 13/610,520, dated Feb. 9, 2015, 12 pp.
Supplemental Amendment to Office Action dated Nov. 7, 2014, from U.S. Appl. No. 13/610,520, dated Feb. 19, 2015, 13 pp.
Office Action from U.S. Appl. No. 13/418,212, dated May 22, 2014, 14 pp.
Notice of Allowance from U.S. Appl. No. 13/418,212, mailed Dec. 9, 2014, 10 pp.
Enyedi et al., "On Finding Maximally Redundant Trees in Strictly Linear Time," IEEE Symposium on Computers and Communications (ISCC), 2009, 11 pp.
Atlas et al., "An Architecture for IP/LDP Fast-Reroute Using Maximally Redundant Trees," Routing Area Working Group Internet Draft, draft-atlas-rtgwg-mrt-frr-architecture-01, Oct. 31, 2011, 27 pp.
Karan et al., "Multicast only Fast Re-Route," Network Working Group Internet Draft, draft-karan-mofrr-00, Mar. 2, 2009, 14 pp.
Wei et al., "Tunnel Based Multicast Fast Reroute (TMFRR) Extensions to PIM," Network Working Group Internet-Draft, draft-lwei-pim-tmfrr-00.txt, Oct. 16, 2009, 20 pp.
Lindem et al., "Extensions to IS-IS and OSPF for Advertising Optional Router Capabilities," Network Working Group Internet Draft, draft-raggarwa-igp-cap-01.txt, Nov. 2002, 12 pp.
Shen et al., "Discovering LDP Next-Nexthop Labels," Network Working Group Internet Draft, draft-shen-mpls-ldp-nnhop-label-02.txt, May 2005, 9 pp.
Enyedi et al., "IP Fast ReRoute: Lightweight Not-Via without Additional Addresses," Proceedings of IEEE INFOCOM, 2009, 5 pp.
Lindem et al., "Extensions to OSPF for Advertising Optional Router Capabilities," RFC 4970, Jul. 2007, 13 pp.
Boers et al., "The Protocol Independent Multicast (PIM) Join Attribute Format," RFC 5384, Nov. 2008, 11 pp.
Enyedi, "Novel Algorithms for IP Fast ReRoute," Department of Telecommunications and Media Informatics, Budapest University of Technology and Economics Ph.D. Thesis, Feb. 2011, 114 pp.
Atlas et al., "An Architecture for Multicast Protection Using Maximally Redundant Trees," Routing Area Working Group Internet Draft, draft-atlas-rtgwg-mrt-mc-arch-00, Mar. 2, 2012, 26 pp.
Atlas et al., "Algorithms for computing Maximally Redundant Trees for IP/LDP Fast ReRoute," Routing Area Working Group Internet Draft, Nov. 28, 2011, 39 pp.
Minei et al., "Label Distribution Protocol Extensions for Point-to-Multipoint and Multipoint-to-Multipoint Label Switched Paths," Network Working Group Internet Draft, draft-ietf-mpls-ldp-p2mp-15, Aug. 4, 2011, 40 pp.
Cai et al., "PIM Multi-Topology ID (MT-ID) Join Attribute," draft-ietf-pim-mtid-10.txt, Sep. 27, 2011, 14 pp.
Atlas et al., "Basic Specification for IP Fast ReRoute: Loop-Free Alternates," RFC 5286, Sep. 2008, 32 pp.
Shand et al., "IP Fast ReRoute Framework," RFC 5714, Jan. 2010, 16 pp.
Shand et al., "IP Fast ReRoute Using Not-via Addresses," Network Working Group Internet Draft, draft-ietf-rtgwg-ipfrr-notvia-addresses-07, Apr. 20, 2011, 29 pp.
Filsfils et al., "LFA applicability in SP networks," Network Working Group Internet Draft, draft-ietf-rtgwg-lfa-applicability-03, Aug. 17, 2011, 33 pp.
Francois et al., "Loop-free convergence using oFIB," Network Working Group Internet Draft, draft-ietf-rtgwg-ordered-fib-05, Apr. 20, 2011, 24 pp.
Rétvári et al., "IP Fast ReRoute: Loop Free Alternates Revisited," Proceedings of IEEE INFOCOM, 2011, 9 pp.
Retana et al., "OSPF Stub Router Advertisement," RFC 3137, Jun. 2001, 5 pp.
Bryant et al., "Remote LFA FRR," Network Working Group Internet Draft, draft-shand-remote-lfa-00, Oct. 11, 2011, 12 pp.
Kahn, "Topological sorting of large networks," Communications of the ACM, vol. 5, Issue 11, pp. 558-562, Nov. 1962.
Moy, "OSPF Version 2," RFC 2328, Apr. 1998, 204 pp.
U.S. Appl. No. 12/419,507, by Kireeti Kompella, filed Apr. 7, 2009.
Atlas et al., "An Architecture for IP/LDP Fast-Reroute Using Maximally Redundant Trees," PowerPoint presentation, IETF 81, Quebec City, Canada, Jul. 27, 2011, 28 pp.
Callon, "Use of OSI IS-IS for Routing in TCP/IP and Dual Environments," RFC 1195, Dec. 1990, 80 pp.

(56) References Cited

OTHER PUBLICATIONS

Shand et al., "A Framework for Loop-Free Convergence," RFC 5715, Jan. 2010, 23 pp.
Vasseur et al., "Intermediate System to Intermediate System (IS-IS) Extensions for Advertising Router Information," RFC 4971, Jul. 2007, 10 pp.
Atlas et al., "Algorithms for computing Maximally Redundant Trees for IP/LDP Fast-Reroute," draft-enyedi-rtgwg-mrt-frr-algorithm-00, Oct. 24, 2011, 36 pp.
Atlas et al., "An Architecture for IP/LDP Fast-Reroute Using Maximally Redundant Trees," draft-atlas-rtgwg-mrt-frr-architecture-00, Jul. 4, 2011, 22 pp.
Karan et al. "Multicast Only Fast Re-Route," Internet-Draft, draft-karan-mofrr-01, Mar. 13, 2011, 15 pp.
U.S. Appl. No. 13/418,152, by Alia Atlas, filed Mar. 12, 2012.
U.S. Appl. No. 13/418,180, by Alia Atlas, filed Mar. 12, 2012.
U.S. Appl. No. 13/418,212, by Alia Atlas, filed Mar. 12, 2012.
Aggarwal, "Extensions to Resource Reservation Protocol—Traffic Engineering (RSVP-TE) for Point-to-Multipoint TE Label Switched Paths (LSPs)," Network Working Group, RFC 4875, 53 pp.
Awduche et al., "RSVP-TE: Extensions to RSVP for LSP Tunnels," Network Working Group, RFC 3209, 61 pp.
Andersson et al., "LDP Specification," Network Working Group, RFC 3036, 124 pp.

S. Giacalone et al., "OSPF Traffic Engineering (TE) Express Path," draft-giacalone-ospf-te-express-path-02.txt, Network Working Group, Internet draft, 15 pp.
U.S. Appl. No. 13/112,961, by David Ward, filed May 20, 2011.
U.S. Appl. No. 13/610,520, by Alia Atlas, filed Sep. 11, 2012.
Atlas et al., "Interface to the Routing System Framework," draft-ward-irs-framework-00, Network Working Group, Jul. 30, 2012, 21 pp.
Atlas, "An Architecture for the Interface to the Routing System," draft-atlas-i2rs-architecture-02, Network Working Group, Aug. 13, 2013, 21 pp.
Atlas et al., "An Architecture for IP/LDP Fast-Reroute Using Maximally Redundant Trees," ddraft-ietf-rtgwg-mrt-frr-architecture-03, Network Working Group, Jul. 12, 2013, 29 pp.
Bahadur et al., "Routing Information Base Info Model," draft-nitinb-i2rs-rib-info-model-01, Network Working Group, Jul. 15, 2013, 24 pp.
Previdi et al., "Segment Routing with IS-IS Routing Protocol," draft-previdi-filsfils-isis-segment-routing-02, IS-IS for IP Internets, Internet Draft, Mar. 20, 2013, 27 pp.
Notice of Allowance from U.S. Appl. No. 13/610,520, mailed Sep. 15, 2015, 8 pp.
Response filed Aug. 18, 2015 to the Final Office Action dated May 18, 2015 in U.S. Appl. No. 13/610,520, 11 pgs.
Office Action from U.S. Appl. No. 13/610,520, dated May 18, 2015, 18 pp.

* cited by examiner

FORWARDING USING MAXIMALLY REDUNDANT TREES

This application claims priority to U.S. Provisional Application No. 61/846,999, filed Jul. 16, 2013; and this application is a continuation-in-part of U.S. patent application Ser. No. 13/418,212, entitled "FAST REROUTE FOR MULTICAST USING MAXIMALLY REDUNDANT TREES," filed on Mar. 12, 2012; this application is a continuation-in-part of U.S. patent application Ser. No. 13/610,520, filed Sep. 11, 2012, entitled "CONSTRAINED MAXIMALLY REDUNDANT TREES FOR POINT-TO-MULTPOINT LSPS," the entire contents of each of which being incorporated by reference herein.

TECHNICAL FIELD

The disclosure relates to computer networks and, more particularly, to forwarding network traffic within computer networks.

BACKGROUND

The term "link" is often used to refer to the connection between two devices on a computer network. The link may be a physical medium, such as a copper wire, a coaxial cable, any of a host of different fiber optic lines or a wireless connection. In addition, network devices may define "virtual" or "logical" links, and map the virtual links to the physical links. As networks grow in size and complexity, the traffic on any given link may approach a maximum bandwidth capacity for the link, thereby leading to congestion and loss.

Multi-protocol Label Switching (MPLS) is a mechanism used to engineer traffic patterns within Internet Protocol (IP) networks. By utilizing MPLS, a source device can request a path through a network, i.e., a Label Switched Path (LSP). An LSP defines a distinct path through the network to carry packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

Historically, MPLS label distribution was driven by protocols such as label distribution protocol (LDP), Resource ReserVation Protocol with Traffic Engineering extensions (RSVP-TE) and labeled Border Gateway Protocol (LBGP). Procedures for LDP by which label switching routers (LSRs) distribute labels to support MPLS forwarding along normally routed paths are described in L. Anderson, "LDP Specification," RFC 3036, Internet Engineering Task Force (IETF), January 2001, the entire contents of which are incorporated by reference herein. RSVP-TE uses constraint information, such as bandwidth availability, to compute and establish LSPs within a network. RSVP-TE may use bandwidth availability information accumulated by a link-state interior routing protocol, such as the Intermediate System—Intermediate System (IS-IS) protocol or the Open Shortest Path First (OSPF) protocol.

Head-end routers of an LSP are commonly known as ingress routers, while routers at the tail-end of the LSP are commonly known as egress routers. Ingress and egress routers, as well as intermediate routers along the LSP that support MPLS, are referred to generically as label switching routers (LSRs). A set of packets to be forwarded along the LSP is referred to as a forwarding equivalence class (FEC). A plurality of FECs may exist for each LSP, but there may be only one active LSP for any given FEC. Typically, a FEC definition includes the IP address of the destination of the LSP, e.g., an IP address assigned to the egress router of the LSP. The ingress label edge router (LER) uses routing information, propagated from the egress LER, to determine the LSP, to assign labels for the LSP, and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR or LER. The egress LER removes the label from the packet and forwards the packet to its destination in accordance with non-label based packet forwarding techniques.

In general, each router along the LSP maintains a context that associates a FEC with an incoming label and an outgoing label. In this manner, when an LSR receives a labeled packet, the LSR may swap the label (i.e., the incoming label) with the outgoing label by performing a lookup in the context. The LSR may then forward the packet to the next LSR or LER along the LSP. The next router along the LSP is commonly referred to as a downstream router or a next hop.

In some instances, a node or link along an LSP may no longer be available. For example, a link along the LSP, or a node may experience a failure event, such as when one or more components of a router fail or the router is brought down by a user, such as a network operator. In these instances, signaling of a new LSP would fail when the LSP was to be explicitly routed along a path that traverses the unavailable link or node. An LSR along the path of the new LSP would detect the failed link or node, and may send an error message indicating that the new LSP cannot be established as requested.

When a link or router in the network fails, routers using traditional link state protocols, such as OSPF and/or IS-IS, may take a long time to adapt their forwarding tables in response to the topological change resulting from node and/or link failures in the network. The process of adapting the forwarding tables is known as convergence. This time delay occurs because each node must update its representation of the network topology and execute the shortest path algorithm to calculate the next-hop for each destination within the updated network topology. Until the next-hops are re-computed, traffic being sent toward the failed links may be dropped.

SUMMARY

In general, techniques are described for using maximally redundant trees (MRTs) for delivering traffic streams across a network, and for transitioning traffic to a new set of MRTs after a topology change, without dropping traffic due to the transition. MRTs are a set of trees where, for each of the MRTS, a set of paths from a root node of the MRT to one or more leaf nodes share a minimum number of nodes and a minimum number of links. Techniques are described herein that make use of distributed computation of a set of MRTs from one or more ingress devices to one or more egress devices of the network. In one example, a plurality of network devices in a network compute a set of MRTs on a network graph representing nodes in the network, and establish a set of destination-rooted trees LSPs along the paths of the set of MRTs from one or more ingress network devices to one or more egress network devices. In another example, the network devices can use the computed set of MRTs for forwarding IP traffic, where packets are encapsulated in IP where the IP destination is an address that is associated with a particular multi-topology identifier for one of the MRTs and a router or destination. After a change to the network topology that necessitates re-computation of the MRTs, convergence sequencing is managed by a central controller, which centrally orchestrates the sequence for moving traffic from being sent on the old MRT paths to being sent on the new MRT paths after the controller determines that all new MRT forwarding state has been installed on the network devices in a network.

Using MRTs for computing destination-rooted spanning trees generally provides link and node disjointness of the spanning trees to the extent physically feasible, regardless of topology, based on the topology information distributed by a link-state Interior Gateway Protocol (IGP). The techniques set forth herein provide mechanisms for handling real networks, which may not be fully 2-connected, due to previous failure or design. A 2-connected graph is a graph that requires two nodes to be removed before the network is partitioned.

The techniques may provide one or more advantages. For example, the techniques can allow for dynamically adapting in network environments in which the same traffic is sent on two or more diverse paths, such as in unicast live-live or multicast live-live. Unicast live-live functionality can be used to reduce packet loss due to network failures on any one of the paths. The techniques of this disclosure can provide for dynamically adapting to network changes in the context of unicast and multicast live-live. The techniques can provide a mechanism that is responsive to changes in network topology without requiring manual configuration of explicit route objects or heuristic algorithms. The techniques of this disclosure do not require operator involvement to recalculate the LSPs in the case of network topology changes. The use of MRTs in this manner can provide live-live functionality, and provide a mechanism for sending live-live streams across an arbitrary network topology so that the disjoint trees can be dynamically recalculated in a distributed fashion as the network topology changes.

As another example, using MRTs for unicast live-live may also scale better than an RSVP-TE based solution, because MRT unicast uses destination-based trees so there is state based only on the number of egress nodes being used. Likewise, multicast live-live uses source-based trees so there is state based only on the number of ingress nodes. The techniques of this disclosure may also be operationally simpler than an RSVP-TE solution.

In one aspect, a method includes receiving, by a centralized controller of a network, an indication from each of a plurality of network devices confirming that each of the plurality of network devices has installed forwarding state associated with an updated set of maximally redundant trees, wherein the updated set of maximally redundant trees were computed based on an updated network graph responsive to a change in topology of the network, wherein the updated set of maximally redundant trees replaces a first set of maximally redundant trees that were computed based on a network graph representing the network prior to the change in topology. The method further includes, responsive to determining that the indication has been received from each of the plurality of network devices from which confirmation is needed, and by the centralized controller, instructing one or more ingress network devices of the plurality of network devices to begin forwarding network traffic according to the forwarding state associated with the updated set of maximally redundant trees, and removing, by the controller, from a routing information base of each of the network devices, forwarding state associated with the first set of maximally redundant trees.

In another aspect, a network device includes one or more hardware-based processors; and a maximally redundant tree management module executing on the one or more processors, wherein the maximally redundant tree management module is configured to receive an indication from each of a plurality of network devices confirming that each of the plurality of network devices has installed forwarding state associated with an updated set of maximally redundant trees, wherein the updated set of maximally redundant trees were computed based on an updated network graph responsive to a change in topology of the network, wherein the updated set of maximally redundant trees replaces a first set of maximally redundant trees that were computed based on a network graph representing the network prior to the change in topology. The maximally redundant tree management module is configured to, responsive to determining that the indication has been received from each of the plurality of network devices from which confirmation is needed, instruct one or more ingress network devices of the plurality of network devices to begin forwarding network traffic according to the forwarding state associated with the updated set of maximally redundant trees, and remove, from a routing information base of each of the network devices, forwarding state associated with the first set of maximally redundant trees.

In another aspect, a computer-readable storage medium includes instructions. The instructions cause a programmable processor to send, by a network device, to a centralized controller of a network, an indication confirming that the network device has installed forwarding state associated with an updated set of maximally redundant trees, wherein the updated set of maximally redundant trees were computed based on an updated network graph responsive to a change in topology of the network, wherein the updated set of maximally redundant trees replaces a first set of maximally redundant trees that were computed based on a network graph representing the network prior to the change in topology, receive, from the centralized controller, instructions to begin forwarding network traffic according to the forwarding state associated with the updated set of maximally redundant trees, and receive, from the centralized controller, instructions to remove, from a routing information base of the network device, forwarding state associated with the first set of maximally redundant trees.

The details of one or more examples are set forth in the accompanying drawings and the description below. Other features, objects, and advantages will be apparent from the description and drawings, and from the claims.

DETAILED DESCRIPTION

Figure 1:
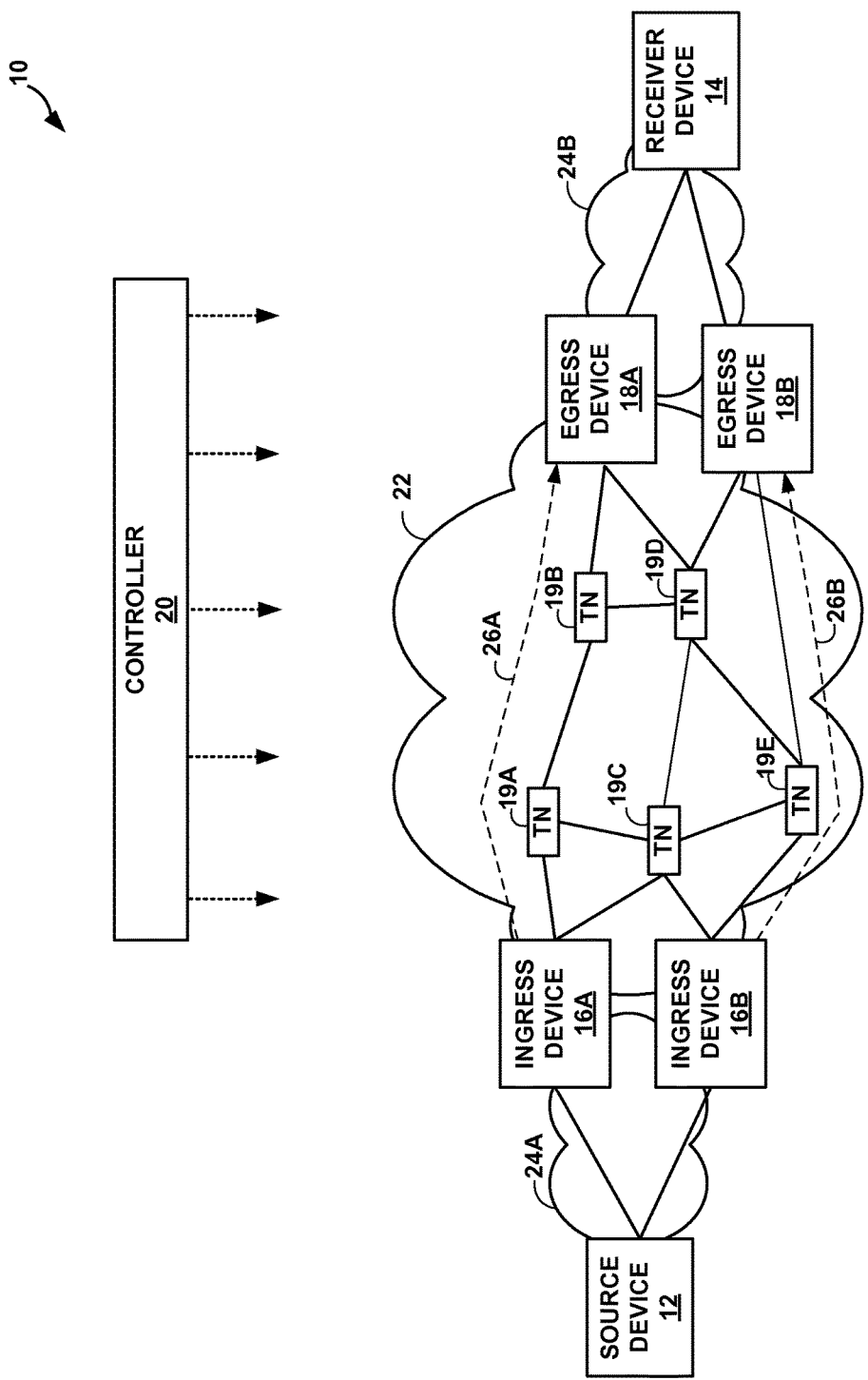
FIG. 1 is a block diagram illustrating an example network in which one or more network devices employ the techniques of this closure.

FIG. 1 is a block diagram illustrating an example system 10 in which a network 22 includes one or more network devices that employ the techniques of this disclosure. In this example, network 22 includes ingress devices 16A-16B (ingress devices 16") and egress devices 18A-18B ("egress devices 18"). Network 22 also includes transit nodes (TNs) 19A-19E ("transit nodes 19"), which may also be referred to as intermediate nodes. Ingress devices 16, egress devices 18, and transit nodes 19 are network devices such as routers, for example.

Ingress devices 16, egress devices 18, and transit nodes 19 are coupled by links, which may be a number of physical and logical communication links that interconnect ingress devices 16, egress devices 18, and transit nodes 19 to facilitate control and data communication between the devices. Physical links of network 22 may include, for example, Ethernet PHY, Synchronous Optical Networking (SONET)/Synchronous Digital Hierarchy (SDH), Lambda, or other Layer 2 data links that include packet transport capability. Logical links of network 22 may include, for example, an Ethernet Virtual local area network (LAN), a Multi-Protocol Label Switching (MPLS) Label Switched Path (LSP), or an MPLS traffic-engineered (TE) LSP.

In the example of FIG. 1, system 10 also includes source device 12 that sends unicast traffic into network 22 via ingress devices 16 and access network 24A, and receiver device 14 that receives the unicast traffic from egress device 18A and/or egress device 18B through access network 24B. The unicast traffic may be, for example, video or multimedia traffic.

Network 22 may be a service provider network that operates as a private network that provides packet-based network services to receiver device 14, which may be a subscriber device, for example. Network 24B may include multiple receiver devices (not shown). Receiver device 14 may be, for example, any of personal computers, laptop computers or other types of computing device associated with subscribers. Subscriber devices may comprise, for example, mobile telephones, laptop or desktop computers having, e.g., a 3G wireless card, wireless-capable netbooks, video game devices, pagers, smart phones, personal data assistants (PDAs) or the like. Subscriber devices may run a variety of software applications, such as word processing and other office support software, web browsing software, software to support voice calls, video games, videoconferencing, and email, among others.

For some traffic flows, such as sent on pseudo-wires, it can be useful to send traffic on two diverse routes from one or more ingress network devices 16 to one or more egress network devices 18 in the network. This disclosure describes how to use Maximally Redundant Trees and a central controller 20 to create such routes, with the ability to partially consider traffic load. The controller 20 manages convergence events. The techniques of this disclosure can be used whether the diverse routes are desired for resiliency (i.e., 1+1) or for throughput (sending different traffic on both paths).

For distribution of unicast traffic, including time-sensitive or critical unicast traffic, network 22 can be set up to employ unicast live-live techniques, in which the same traffic is sent on two or more diverse unicast paths. Unicast live-live functionality can be used to reduce packet loss due to network failures on any one of the paths. As explained in further detail below, in some examples, controller 20 can instruct ingress device(s) 16A and/or 16B to compute a set of spanning trees that are maximally redundant trees from ingress device(s) 16A and/or 16B to egress device(s) 18A and/or 18B. Maximally Redundant Trees (MRTs) can be used to compute diverse paths between any two nodes in a network (that has such paths). The MRTs are spanning trees to reach all routers in the network graph, rooted at egress PE routers 18. In some examples, the set of MRTs includes a pair of MRTs. The pair of MRTs may sometimes be referred to as the Blue MRT and the Red MRT. The nodes in network 22 can each use a common algorithm to compute the MRTs as rooted at one of egress network devices 18. Where both of egress network devices 18 are needed, the MRTs are computed as rooted at a proxy node connected to both of egress network devices 18. Ingress devices 16 and TNs 19 compute the MRTs as a pair of MRTs that traverse maximally disjoint paths from the one or more of ingress devices 16 to one or more of egress devices 18. Ingress devices 16 can dynamically recalculate maximally redundant trees, e.g., responsive to detecting changes to the topology of network 22 or at the direction of controller 20.

In some aspects, ingress devices 16, egress devices 18, and transit nodes 19 may be Internet Protocol (IP) routers that implement Multi-Protocol Label Switching (MPLS) techniques and operate as label switching routers (LSRs). In some examples, at the direction of controller 20, or based on local configuration, ingress device 16A may establish a set of LSPs 26A-26B ("LSPs 26") along the maximally redundant trees for concurrently sending the same unicast traffic from source device 12 to receiver device 14. For example, ingress devices 16 can assign a label to each incoming packet received from source device 12 based on the destination of the packets and the forwarding equivalence classes of the labels before forwarding the packet to a next-hop transit node 19. Each transit node 19 makes a forwarding selection and determines a new substitute label by using the label found in the incoming packet as a reference to a label forwarding table that includes this information. The paths taken by packets that traverse the network in this manner are referred to as LSPs.

Each of ingress devices 16, egress devices 18, and transit nodes 19 may each compute, in a distributed fashion using a common algorithm, a pair of MRTs based on the current network topology. The ingress devices 16, egress devices 18, and transit nodes 19 will obtain the same pair of MRTs from the computation, and will advertise labels to their LDP peers for reaching the destination (root) of the MRTs via MRT-red and MRT-blue, and install in forwarding information the labels and next hops for sending traffic toward the destination via MRT-red and MRT-blue. In this manner, LSPs 26 can be set up in network 22 along the MRTs. For example, LSP 26A may follow the red MRT and LSP 26B may follow the blue MRT.

After establishing the LSPs 26, ingress devices 16 may receive unicast data traffic from source device 12, and ingress devices 16 can forward the multicast data traffic along both of LSPs 26A and 26B. That is, ingress device 16A and ingress device 16B concurrently send the same unicast traffic received from source device 12 to receiver device 14 on both of the first LSP 26A and the second LSP 26B. In this manner, ingress device 16A and ingress device 16B send redundant unicast data traffic along both of LSPs 26A and 26B, which provides unicast live-live service.

In the example of multicast live-live, ingress devices 16, egress devices 18, and transit nodes 19 can likewise establish Point-to-Multipoint (P2MP) LSPs along source-rooted MRTs for sending multicast live-live traffic to receiver device 14.

In some examples, ingress devices 16, egress devices 18, and transit nodes 19 can use IP encapsulation for forwarding IP traffic along the computed MRTs, where the IP destination is an address that is associated with a particular multi-topology identifier for each of the MRTs and a router or destination.

Controller 20 manages convergence events. In some examples, when a topology change occurs in network 22, the re-computation of MRTs needed in view of the topology change may affect both the blue and red MRT forwarding trees. So, when the topology changes, all ingress nodes continue to send on the MRT Red-1 or MRT Blue-1. In some examples, responsive to detecting the topology change, controller 20 re-computes new MRTs (e.g., MRT Red-2 and MRT Blue-2) and installs the new forwarding state for the new MRTs into all LSRs (or relevant LSRs known to be on path from an ingress to an egress) for MRT Red-2 and MRT Blue-2. In other examples, responsive to detecting the topology change, controller 20 instructs all LSRs (or the relevant LSRs) to compute and install the new MRTs.

Responsive to confirming that the new LFIB entries are installed in each LSR, controller 20 instructs each ingress node 16 to switch from using MRT Red-1 and MRT Blue-1 to using MRT Red-2 and MRT Blue-2. To confirm, in some examples controller 20 may wait a time period, or may await a response from each of the LSRs indicating that the new forwarding state is installed in the labeled forwarding information base (LFIB) of each LSR. Controller 20 also confirms that the ingress nodes 16 that the ingress nodes 16 have switched to the new MRTs and that traffic is no longer flowing on the old MRTs. Responsive to confirming this, controller 20 can remove the old MRT Red-1 and MRT Blue-1 state from Ingress devices 16, egress devices 18, and transit nodes 19, e.g., by directly interfacing with the routing information bases of these devices. This completes the convergence, and the controller 20 is prepared to do the same sequence for the next topology event.

Changes in the network topology may be communicated among devices 16, 18, and transit nodes 19 in various ways, for example, by using a link-state protocol, such as interior gateway protocols (IGPs) like the Open Shortest Path First (OSPF) and Intermediate System to Intermediate System (IS-IS) protocols. That is, devices 16, 18, and transit nodes 19 can use the IGPs to learn link states and link metrics for communication links between the nodes within the interior of network 22. If a communication link fails or a cost value associated with a network node changes, after the change in the network's state is detected by one of devices 16, 18, and transit nodes 19, that device may flood an IGP Advertisement communicating the change to the other devices in the network. In other examples, devices 16, 18, and transit nodes 19 can communicate the network topology using other network protocols, such as an interior Border Gateway Protocol (iBGP), e.g., BGP-Link State (BGP-LS). In this manner, each of the routers eventually "converges" to an identical view of the network topology.

For example, devices 16, 18, and transit nodes 19 may use OSPF or IS-IS to exchange routing information with routers 12, 20. Devices 16, 18, and transit nodes 19 may store the routing information to a routing information base that devices 16, 18, and transit nodes 19 use to compute optimal routes to destination addresses advertised within network 22. In addition, devices 16, 18, and transit nodes 19 can store to a traffic engineering database (TED) any traffic engineering (TE) metrics or constraints received via the IGPs advertisements.

In some examples, ingress devices 16 may create LSPs by computing the entire trees as MRTs and signaling the LSPs (e.g., using a resource reservation protocol such as RSVP-TE). In other examples, devices 16, 18, and transit nodes 19 perform the MRT computation and establishment of LSPs 26A-26B in a distributed fashion, e.g., using LDP for exchanging labels for the LSPs 26. As a further example, a path computation element (PCE) of controller 20 may alternatively or additionally provide configuration information to one or more of devices 16, 18, and transit nodes 19, e.g., may compute the MRTs and provide them to ingress devices 16. For example, controller 20 may include a topology module that can learn the topology from IGP, BGP, or another mechanism and then perform the MRT computation and provide the result to devices 16, 18, and transit nodes 19.

For controller 20 to orchestrate convergence, controller 20 may include various capabilities: a way to rapidly learn topology (e.g. an IGP feed), the ability to quickly install and remove LFIB entries, the ability to be notified when LFIB entries have successfully been installed to the forwarding plane, the ability to direct pseudowires from using one LSP to using another, and the ability to be notified when the pseudo-wire has changed to using the new LSP. In some examples, controller 20 could request and be allocated a range of MPLS labels to use in the LFIB and directly install state to all LSRs as quickly as controller 20 can work. Controller 20 may use an Interface to the Routing System (I2RS) framework. Examples of an interface for a controller to communicate with routers in a network for routing and forwarding data is described in A. Atlas, "Interface to the Routing System Framework," Internet-Draft, Network Working Group, Jul. 30, 2012; N. Bahadur, "Routing Information Base Info Model," Internet-Draft, Network Working Group, Jul. 15, 2013; AND A. Atlas, "An Architecture for the Interface to the Routing System," Internet-Draft, Network Working Group, Aug. 13, 2013, the entire contents of each of which are incorporated by reference herein.

If there are multiple ingress nodes or egress nodes in a network graph, these can be represented in the network graph by creating a "proxy node" attached to both of the ingresses or both of the egresses. When computing the MRTs to the egress devices 18A and 18B, the ingress devices 16 will attach a proxy node to egress devices 18A and 18B to represent a shared egress. Ingress device 16A computes a path to reach the proxy node via egress device 18A, and ingress device 16B computes a path to reach the proxy node via egress device 18B. Because of the way the proxy node is attached to egress devices 18A and 18B, one of egress devices 18A and 18B will attach to the proxy node via blue MRT and the other will attach to the proxy node via red MRT, and so egress device 18A and egress device 18B will end up taking MRT-blue and MRT-red, respectively, based on how the destination is connected up to the proxy node. More details on using proxy nodes are described in U.S. patent application Ser. No. 13/418,212, entitled "FAST REROUTE FOR MULTICAST USING MAXIMALLY REDUNDANT TREES," filed on Mar. 12, 2012; and A. Atlas, "An Architecture for IP/LDP Fast-Reroute Using Maximally Redundant Trees," Internet-Draft, Routing Area Working Group, Jul. 12, 2013, the entire contents of each of which are incorporated by reference herein. One advantage of MRTs is that there is a lot less computation so devices 16, 18, and 19 can compute the MRTs for all sources for multicast and all destinations for unicast, and each device computes its part of each of those MRTs.

In some examples, devices 16, 18, and transit nodes 19, or controller 20, can use a method of computing the maximally redundant trees that also considers traffic-engineering constraints, such as bandwidth, link color, priority, and class type, for example. In accordance with one example aspect of this disclosure, devices 16, 18, and transit nodes 19, or controller 20, computes a set of spanning trees that are maximally redundant trees (MRTs) over a network graph that represents at least a portion of links and nodes in network 22.

If controller 20 is aware of the flows and link capacities, then controller 20 could compute destination-based MRTs separately for each egress-node and prune the topology in between computations based upon whether the links would have enough capacity for the next set of flows to the egress-node. Controller 20 would then be able to revert the topology to the way it was before pruning if the pruning would cause additional common failure points (cut-links or cut-vertices). Examples of constraint-based MRT pruning are described in U.S. application Ser. No. 13/610,520, filed Sep. 11, 2012, entitled "CONSTRAINED MAXIMALLY REDUNDANT TREES FOR POINT-TO-MULTPOINT LSPS," the entire contents of which are incorporated by reference herein.

In this manner, the techniques of this disclosure allow for using distributed computation of MRTs and setting up LSPs, but using a centralized approach in order to sequence the traffic during re-convergence after topology change so that traffic delivery is not disrupted as a result of the re-convergence. Controller 20 manages the process that is implemented in a distributed fashion by the network devices of system 10. The process is therefore not dependent on the controller 20 to understand or implement MRTs or to even know the topology of network 22. In some example aspects, controller 20 does not need to have a topology database, and does not have to have a path computation element. All controller needs to know is which routers exist, and the ability to assign new MT IDs to use for the next topology event. Controller 20 can orchestrate the convergence sequence, for computing a new path, and moving the traffic from the old path to the new path, in a way that a distributed convergence cannot do as quickly.

In another example, controller 20 could do phasing with a worst-case network reconvergence time as follows: (a) Stay on old MRT-Red and old MRT-Blue. (b) Compute and install temp MRT-Red and temp MRT-Blue. (c) Wait the worst-case network convergence time. (d) Move traffic to temp MRT-Red and temp MRT-Blue. (e) Wait the worst-case network convergence time (or as necessary for all traffic to be moved). (f) Update old MRT-Red and old MRT-Blue to be the same as temp MRT-Red and temp MRT-Blue. (g) Wait the worst-case network convergence time. (h) Move traffic from the temp MRT-Red and temp MRT-Blue to the updated MRT-Red and MRT-Blue. (i) Wait the worst-case network convergence time (or as necessary for all traffic to be moved). (j) Remove the temp MRT-Red and temp MRT-Blue state.

Although techniques of this disclosure are described by way of example in terms of unicast live-live forwarding, the techniques of this disclosure can also readily be applied for controller 20 managing the sequencing for convergence in multicast live-live forwarding.

Figure 2:
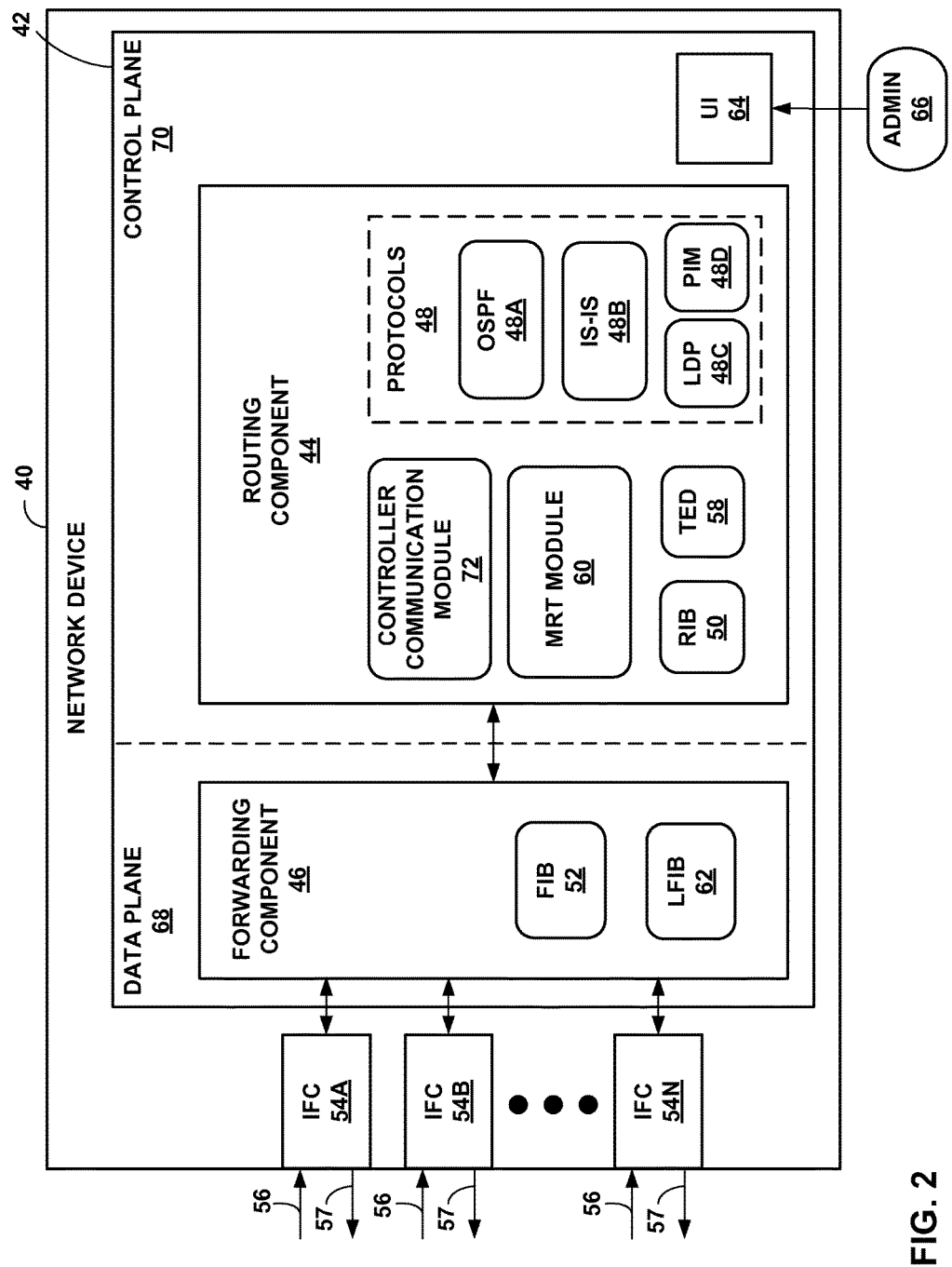
FIG. 2 is a block diagram illustrating an example network device that operates in accordance with the techniques of this disclosure.

FIG. 2 is a block diagram illustrating an example network device 40 that operates in accordance with the techniques of this disclosure. Network device 40 may correspond to any of devices 16, 18, and transit nodes 19 of FIG. 1. Network device 40 includes interface cards 54A-54N ("IFCs 54") for receiving packets via input links 56A-56N ("input links 56") and sending packets via output links 57A-57N ("output links 57"). IFCs 54 are interconnected by a high-speed switch (not shown) and links 56, 57. In one example, switch 40 comprises switch fabric, switchgear, a configurable network switch or hub, and the like. Links 56, 57 comprise any form of communication path, such as electrical paths within an integrated circuit, external data busses, optical links, network connections, wireless connections, or other type of communication path. IFCs 54 are coupled to input links 56 and output links 57 via a number of interface ports (not shown).

When network device 40 receives a packet via one of input links 56, control unit 42 determines via which of output links 57 to send the packet. Control unit 42 includes routing component 44 and forwarding component 46. Routing component 44 determines one or more routes through a network, e.g., through interconnected devices such as other routers. Control unit 42 provides an operating environment for protocols 48, which are typically implemented as executable software instructions. As illustrated, protocols 48 include OSPF 48A and intermediate system to intermediate system (IS-IS) 48B. Network device 40 uses LDP 48C to exchange labels for setting up LSPs. Protocols 48 also include Protocol Independent Multicast 48D, which can be used by network device 40 for transmitting multicast traffic. Protocols 48 may include other routing protocols in addition to or instead of OSPF 48A and IS-IS 48B, such as other Multi-protocol Label Switching (MPLS) protocols including RSVP-TE; or routing protocols, such as Internet Protocol (IP), routing information protocol (RIP), border gateway protocol (BGP), interior routing protocols, other multicast protocols, or other network protocols.

By executing the routing protocols, routing component 44 identifies existing routes through the network and determines new routes through the network. Routing component 44 stores routing information in a routing information base (RIB) 50 that includes, for example, known routes through the network. RIB 50 may simultaneously include routes and associated next-hops for multiple topologies, such as the Blue MRT topology and the Red MRT topology.

Forwarding component 46 stores forwarding information base (FIB) 52 that includes destinations of output links 57. FIB 52 may be generated in accordance with RIB 50. FIB 52 and LFIB 62 may be a radix tree programmed into dedicated forwarding chips, a series of tables, a complex database, a link list, a radix tree, a database, a flat file, or various other data structures. FIB 52 or LFIB 62 may include MPLS labels, such as for LDP LSPs 26 (FIG. 1). FIB 52 or LFIB 62 may simultaneously include labels and forwarding next-hops for multiple topologies, such as the Blue MRT topology and the Red MRT topology.

Network device 40 includes a data plane 68 that includes forwarding component 46. In some aspects, IFCs 54 may be considered part of data plane 68. Network device 40 also includes control plane 70. Control plane 234 includes routing component 44 and user interface (UI) 64. Although described for purposes of example in terms of a router, network device 40 may be, in some examples, any network device capable of performing the techniques of this disclosure, including, for example, a network device that includes routing functionality and other functionality.

A system administrator ("ADMIN 66") may provide configuration information to network device 40 via UI 64 included within control unit 42. For example, the system administrator 66 may configure network device 40 or install software to provide MRT functionality as described herein. As another example, the system administrator 66 may configure network device 40 with a request to establish a set of LSPs or IP tunnels from one or more ingress routers to one or more egress routers. As a further example, a path computation element (PCE) of controller 20 may alternatively or additionally provide configuration information to network device 40. In some examples, a PCE of controller 20 may compute the set of MRTs and provide them to network device 40, with instructions to network device 40 to install forwarding state for LSPs or IP tunnels along the MRTs.

In some examples, controller 20 may request that network device 40 establish unicast live-live forwarding state for LSPs, and may provide network device with at least two pairs of multi-topology identifiers (MT-IDs). The MT-IDs provided may include a first set of multi-topology identifiers, each multi-topology identifier of the first set of set of multi-topology identifiers for identifying a different maximally redundant tree of a first set of maximally redundant trees. The provided MT-IDs may also include a second set of multi-topology identifiers, each multi-topology identifier of the second set of set of multi-topology identifiers for identifying a different maximally redundant tree of the second set of maximally redundant trees. As shown in FIG. 2, control plane 70 of network device 40 has a modified CSPF module, referred to as MRT module 60 that computes the trees using an MRT algorithm. MRT module 60 may associate the first set of multi-topology identifiers with a first set of computed MRTs, and may associate the second set of multi-topology identifiers with a later-computed set of MRTs to be used after a change in network topology. MRT module 60 may compute MRTs for delivering unicast live-live traffic. In some cases, network device is configured to compute the MRTs on its own, without requiring a request from controller 20 to do so.

The following terminology is used herein. A network graph is a graph that reflects the network topology where all links connect exactly two nodes and broadcast links have been transformed into the standard pseudo-node representation. The term "2-connected," as used herein, refers to a graph that has no cut-vertices, i.e., a graph that requires two nodes to be removed before the network is partitioned. A "cut-vertex" is a vertex whose removal partitions the network. A "cut-link" is a link whose removal partitions the network. A cut-link by definition must be connected between two cut-vertices. If there are multiple parallel links, then they are referred to as cut-links in this document if removing the set of parallel links would partition the network.

A "2-connected cluster" is a maximal set of nodes that are 2-connected. The term "2-edge-connected" refers to a network graph where at least two links must be removed to partition the network. The term "block" refers to either a 2-connected cluster, a cut-edge, or an isolated vertex. A Directed Acyclic Graph (DAG) is a graph where all links are directed and there are no cycles in it. An Almost Directed Acyclic Graph (ADAG) is a graph that, if all links incoming to the root were removed, would be a DAG. A Generalized ADAG (GADAG) is a graph that is the combination of the ADAGs of all blocks. Further information on MRTs may be found at A. Atlas, "An Architecture for IP/LDP Fast-Reroute Using Maximally Redundant Trees," Internet-Draft, Routing Area Working Group, Jul. 12, 2013; A. Atlas, "Algorithms for Computing Maximally Redundant Trees for IP/LDP Fast-Reroute," Internet-Draft, Routing Area Working Group, draft-enyedi-rtgwg-mrt-frr-algorithm-03, Jul. 15, 2013; A. Atlas, "An Architecture for Multicast Protection Using Maximally Redundant Trees," Internet-Draft, Routing Area Working Group, draft-atlas-rtgwg-mrt-mc-arch-02 Jul. 12, 2013; the entire contents of each of which are incorporated by reference herein.

Redundant trees are directed spanning trees that provide disjoint paths towards their common root. These redundant trees only exist and provide link protection if the network graph is 2-edge-connected and node protection if the network graph is 2-connected. Such connectiveness may not be the case in real networks, either due to architecture or due to a previous failure. Maximally redundant trees are useful in a real network because they may be computable regardless of network topology. Maximally Redundant Trees (MRT) are a set of trees where the path from any node X to the root R along one tree and the path from the same node X to the root along any other tree of the set of trees share the minimum number of nodes and the minimum number of links. Each such shared node is a cut-vertex. Any shared links are cut-links. That is, the maximally redundant trees are computed so that only the cut-edges or cut-vertices are shared between the multiple trees. In any non-2-connected graph, only the cut-vertices and cut-edges can be contained by both of the paths. That is, a pair of MRTs, such as MRT 25A and MRT 25B, are a pair of trees that share a least number of links possible and share a least number of nodes possible. Any RT is an MRT but many MRTs are not RTs. MRTs are practical to maintain redundancy even after a single link or node failure. If a pair of MRTs is computed rooted at each destination, all the destinations remain reachable along one of the MRTs in the case of a single link or node failure. The MRTs of a pair of MRTs may be individually referred to as a Red MRT and a Blue MRT.

Computationally practical algorithms for computing MRTs may be based on a common network topology database. A variety of algorithms may be used to calculate MRTs for any network topology. These may result in trade-offs between computation speed and path length. Many algorithms are designed to work in real networks. For example, just as with SPF, an algorithm is based on a common network topology database, with no messaging required. In one example aspect, MRT computation for multicast Live-Live may use a path-optimized algorithm based on heuristics. Some example algorithms for computing MRTs can be found in U.S. patent application Ser. No. 13/418,212, entitled "Fast Reroute for Multicast Using Maximally Redundant Trees," filed on Mar. 12, 2012, the entire contents of which are incorporated by reference herein.

Although described for purposes of example in terms of a set of MRTs being a pair of MRTs, in other examples ingress devices 16 may compute a set of constrained MRTs that includes more than two MRTs, where each MRT of the set traverses a different path, where each path is as diverse as possible from each other path. In such examples, more complex algorithms may be needed to compute a set of MRTs that includes more than two MRTs.

In some aspects, MRT module 60 may compute the MRTs in response to receiving a request to traffic-engineer a diverse set of P2MP LSPs to a plurality of egress routers, such as to be used for multicast live-live redundancy in forwarding multicast content. For example, administrator 66 may configure network device 40 with the request via UI 64. The request may specify that the P2MP LSPs satisfy certain constraints. TE constraints specified by the request may include, for example, bandwidth, link color, Shared Risk Link Group (SRLG), and the like. Network device 40 may store the specified TE constraints to TED 58.

In this example, MRT module 60 computes a set of MRTs from network device 40 as the ingress device, to a plurality of egress devices. Network device 40 may compute the set of MRTs on a network graph having links that each satisfy stored traffic engineering (TE) constraints obtained from TE constraints database 62 in the control plane 70 of network device 40. In some examples, constrained MRT module 60 may obtain the network graph having links that each satisfy the TE constraints by starting with an initial network graph based on network topology information obtained from TED 58, and pruning links of the initial network graph to remove any network links that do not satisfy the TE constraints, resulting in a modified network graph. In this example, constrained MRT module 60 uses the modified network graph for computing the set of MRTs.

After computing the set of MRTs, whether for unicast or multicast, network device 40 installs forwarding state for multiple LSPs from network device 40 toward the egress network devices. For unicast, LDP module 48C of network device 40 may send an LDP label mapping message, and for multicast, network device 40 may use a resource reservation protocol (e.g., RSVP-TE) to send Path messages that specify a constrained path for setting up the P2MP LSPs. For example, MRT module 60 can communicate with LDP module 48C to provide LDP module 48C with the computed set of MRTs to be used for signaling the LSP, and the MT-IDs to use with the advertised labels. Network device 40 can send different label mapping messages for different LSPs for each MRT of the set of MRTs.

After establishing the LSPs 26, network device 40 may receive unicast data traffic from multicast source device 12, and network device 40 can forward the unicast data traffic along both of LSPs 26. That is, network device 40 concurrently sends unicast traffic received from source device 12 to receiver device 14 on both of the first LSP 26A and the second LSP 26B. In this manner, ingress devices 16 send redundant multicast data traffic along both of LSPs 26, which provides unicast live-live service.

The techniques of this disclosure provide a mechanism for dynamically adapting unicast live-live that is responsive to changes in network topology without requiring manual configuration of explicit route objects or heuristic algorithms. Operator involvement is not needed to recalculate the LSPs in the case of network topology changes.

If network device 40 detects that changes have occurred to the topology of system 10, MRT module 60 of network device 40 may re-compute MRTs, or portions of MRTs, to determine whether changes are needed to LSPs 26. In the example of multicast live-live, if network device 40 detects that that a new multicast receiver is added to system 10, network device 40 can send an updated Path message to add a branch to each of P2MP LSPs, without needing to re-signal the entire P2MP LSPs.

In some aspects, network device 40 may be configured to run a periodic re-optimization of the MRT computation, which may result in a similar transition from old MRTs to new MRTs. For example, MRT module 60 of network device 40 can periodically recompute the pair of MRTs, to determine whether a more optimal pair of MRTs exists on the network graph.

Once MRT module 60 computes the MRTs, the two sets of MRTs may be seen by the forwarding plane as essentially two additional topologies. Thus, the same considerations apply for forwarding along the MRTs as for handling multiple topologies. For LDP, it may be desirable to avoid tunneling because, for at least node protection, tunneling requires knowledge of remote LDP label mappings and thus requires targeted LDP sessions and the associated management complexity. Two different example mechanisms that network device 40 can use for handling the multiple topologies and marking packets being sent onto the different MRT topologies, are described below.

A first option, referred to herein as Option A, is to encode MRT topology in labels. For example, in addition to sending a single label for a FEC, LDP module 48C of network device 40 would provide two additional labels with their associated MRT colors. Each additional label specifies an MRT topology (blue or red) associated with one of the maximally redundant trees. This approach may be simple, but can reduce the label space for other uses. This approach may also increase the memory needed to store the labels and the communication required by LDP.

A second option, referred to herein as Option B, is to create topology-identification labels (topology-id labels"). The topology-id labels may be stored in LFIB 62, and may be LDP labels. In this approach, LDP module 48C uses the label-stacking ability of multi-protocol label switching (MPLS) and specifies only two additional labels, one for each associated MRT color, by a new FEC type. When sending a packet onto an MRT, LDP module 48C first swaps the LDP label and then pushes the topology-id label for that MRT color. When receiving a packet with a topology-id label, LDP module 48C pops the topology-id label and uses the topology-id label to guide the next-hop selection in combination with the next label in the stack. For example, LDP module 48C does a lookup within FIB 52 on the next inner label or the IP address of the packet (in the case of IP), and that lookup returns a set of sets of next-hops. LDP module 48C then uses the topology-id label to select among the sets. For example, if the topology-id label indicates the blue MRT should be used, LDP module 48C uses the next-hop (or stack of next-hops) for the blue MRT. Similarly, if the topology-id label indicates the red MRT should be used, LDP module 48C uses the next-hop (or stack of next-hops) for the red MRT. If there is no topology-id label, then LDP module 48C may just use the shortest path tree (SPT) next-hop (primary next-hop). LDP module 48C then swaps the remaining label, if appropriate, and pushes the topology-id label if needed for use the next-hop, and outputs the labeled packet on the outbound interface associated with the next-hop.

The topology-id label approach has minimal usage of additional labels, memory, and LDP communication. The topology-id label approach does increase the size of packets and the complexity of the required label operations and look-ups. The topology-id label approach can, for example, use the same mechanisms as are needed for context-aware label spaces. For example, the top-level topology-id label may give context, and the next label may give next-hops. Further details on context-aware label spaces can be found within U.S. application Ser. No. 12/419,507, entitled TRANSMITTING PACKET LABEL CONTEXTS WITHIN COMPUTER NETWORKS, filed Apr. 9, 2009, the entire content of which is incorporated by reference herein.

Note that with LDP unicast forwarding, regardless of whether topology-identification label or encoding topology in label is used, no additional loopbacks per router are required as are required in the IP unicast forwarding case. This is because LDP labels are used on a hop-by-hop basis to identify MRT-blue and MRT-red forwarding trees.

LDP module 48C may be configured with extensions to LDP in various ways. For example, LDP module 48C may be configured to specify the topology in the label. That is, when sending a Label Mapping in a label mapping message that maps a FEC to a label, LDP module 48C may have the ability to include a topology identifier in the FEC TLV and send an associated Label TLV. The FEC TLV would include a multi-topology identifier (MT-ID) that is assigned to specify MRT and the associated MRT color. In the example of Topology-Identification Labels, LDP would be extended to define a new FEC type that describes the topology for MRT and the associated MRT color. Another example option may be for LDP module 48C to advertise, per interface, a label indicating what the original incoming interface would have been.

For IP unicast traffic, tunneling may be used. The tunnel egress could be the original destination in the area, the next-next-hop, etc. If the tunnel egress is the original destination router, then the traffic remains on the redundant tree with sub-optimal routing. If the tunnel egress is the next-next-hop, then protection of multi-homed prefixes and node-failure for ABRs is not available. Selection of the tunnel egress is a router-local decision.

The following are a few options for marking IP packets with which MRT the receiving device should use for forwarding the received IP packets. First, a network device 100 may tunnel IP packets via an LDP LSP. This has the advantage that more installed routers can do line-rate encapsulation and decapsulation. Also, no additional IP addresses would need to be allocated or signaled. Option A within this approach is to use a LDP Destination-Topology Label. MRT module 60 may use a label that indicates both the destination and the MRT. This method allows easy tunneling to the next-next-hop as well as to the IGP-area destination. For multi-homed prefixes, this requires that additional labels be advertised for each proxy-node. Option B within this approach is to use a LDP Topology Label. MRT module 60 may use a Topology-Identifier label on top of the IP packet. This is simple and does not require additional labels for proxy-nodes. If tunneling to a next-next-hop is desired, then a two-deep label stack can be used with [Topology-ID label, Next-Next-Hop Label].

Another approach is to tunnel IP packets in IP. Each router supporting this option may announce two additional loopback addresses and their associated MRT color. Those addresses are used as destination addresses for MRT-blue and MRT-red IP tunnels, respectively. The announced additional loopback addresses allow the transit nodes to identify the traffic as being forwarded along either MRT-blue or MRT-red tree topology to reach the tunnel destination. The IGP, such as OSPF 48A or IS-IS 48B, may be extended to employ announcements of these two additional loopback addresses per router with the associated MRT color. Another option that might be used is a "pure" IP unicast option that uses a new IP (either IPv4 or IPv6) hop-by-hop option to specify the MRT color. Possibly only some platforms or linecards would be able to support this approach at line rate. A network device 40 that uses the IP option may process the IP option in the fast path, rather than feeding the packet to a line card to process.

For proxy-nodes associated with one or more multi-homed prefixes, the problem is harder because there is no router associated with the proxy-node, so its loopbacks can't be known or used. In this case, each router attached to the proxy-node could announce two common IP addresses with their associated MRT colors. This would require configuration as well as the previously mentioned IGP extensions. Similarly, in the LDP case, two additional FEC bindings could be announced.

In general, when network device 40 receives a packet, forwarding component 46 may do a lookup of FIB 52 or LFIB 62 using the label of the received packet as a key. FIB 52 or LFIB 62 may return a set of next-hops, including the primary next-hop and any alternate next-hops (e.g., LFA and MRT next-hops). When a topology-id label is used, forwarding component 46 may do a lookup on the topology-id label to find the correct context and then use the next label of the received packet as a key and FIB 52 or LFIB 62 may return a set of next-hops associated with that topology-id for the second label; those next-hops would be for either the Blue MRT or the Red MRT topology. In another approach, forwarding component 46 may do a lookup of FIB 52 or LFIB 62 the second label of the received packet as a key. FIB 52 or LFIB 62 may return multiple sets of next-hops and the topology-id label is used to pick the appropriate set of next-hops to use.

Network device 40 may detect a change to the topology of network 22, e.g., a link or node failure, or, in case of multicast, a change to a multicast receiver. For example, network device 40 may be local to the change, or may detect it based on a link state advertisement (LSA) received from a peer device. Responsive to detecting the topology change, network device 40 a device local to the change may begin forwarding network traffic on the other color MRT in the earlier-computed pair of MRTs. Once aware of the topology change, network device 40 can re-compute the pair of MRTs based on a modified network graph reflecting the topology change, while traffic is still being received in the meantime by receiver device 14 via the one MRT path that is still working of the first set of MRTs. MRT modules 60 of network device 40 can then create and install new forwarding state based on the updated, re-computed MRTs.

Upon installing the new forwarding state based on the updated, re-computed MRTs, network device 40 can notify controller 20 that the updated MRT forwarding state has been installed. For example, controller communication module 72 of network device 40 can notify controller 20. In some examples, the notification may specify a network topology on which the updated set of maximally redundant trees was computed by network device 40. For example, the indication may specify a network topology by including at least an indication of a LSA received by network device 40 that triggered computation of the updated set of maximally redundant trees. In some cases, the notification may also specify a number of seconds in which the updated set of maximally redundant trees was computed, so that controller 20 can determine whether the topology on which the MRTs were computed is still current. The notification may also specify the MT-IDs of the old MRTs that have been impacted by the topology change, and/or the MT-IDs of the new MRTs for which forwarding state has been installed.

Network device 40 may receive instructions from controller 20, e.g., via controller communication module 70, to begin forwarding traffic on the new, updated MRTs using the new forwarding state that controller 20 has confirmed to be installed on all of the network devices. In response, network device 40 will begin forwarding traffic on the LSPs 26 associated with the new MRTs. Controller 20 may also delete forwarding state for the old MRTs, e.g., from RIB 50, FIB 52, and/or LFIB 62.

Figure 3:
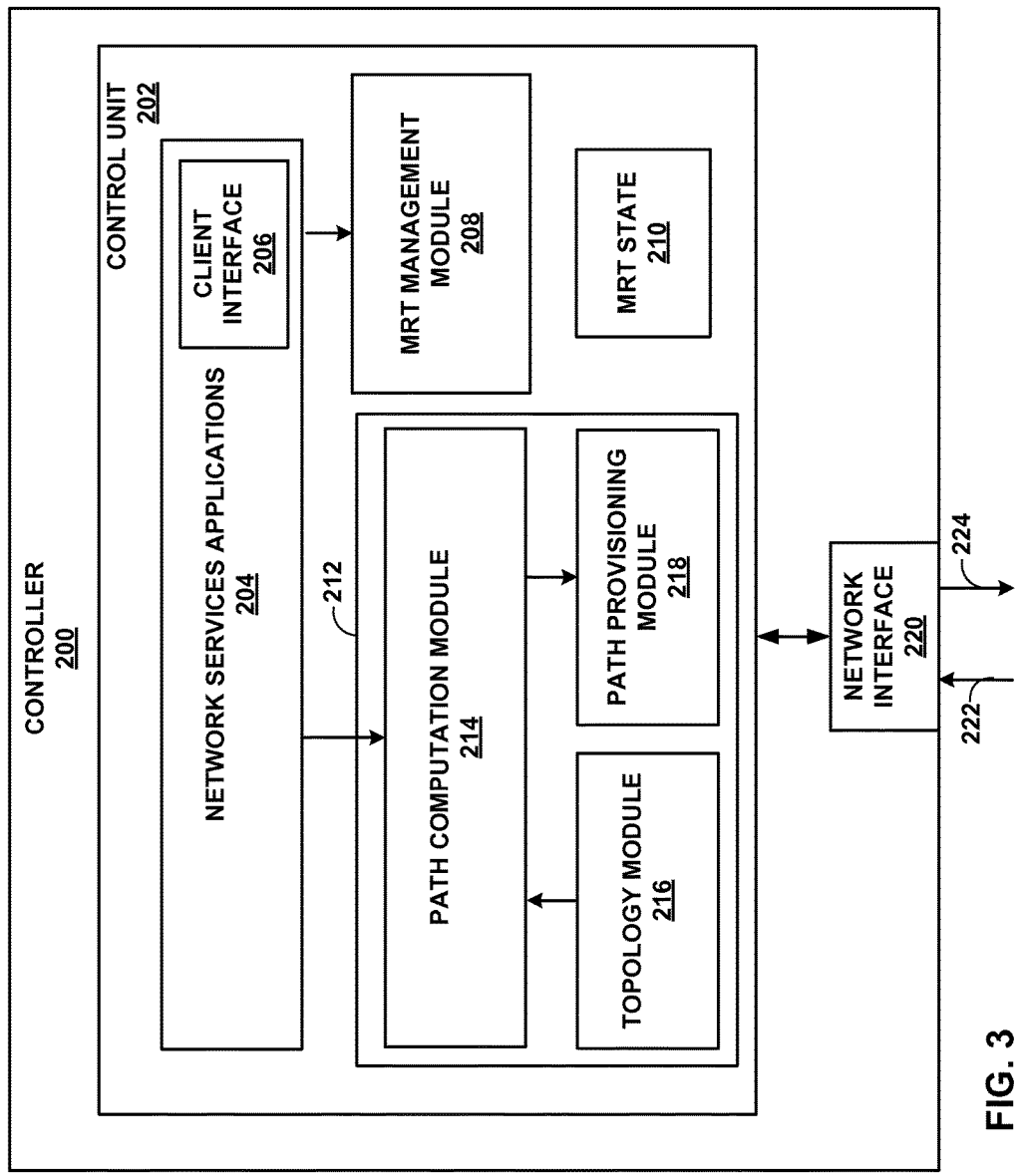
FIG. 3 is a block diagram illustrating an example controller that operates in accordance with the techniques of this disclosure.

FIG. 3 is a block diagram illustrating an example controller that operates in accordance with the techniques of this disclosure. Controller 200 may include a server or network controller, for example, and may represent an example instance of controller 20 of FIG. 1.

Controller 200 includes a control unit 202 coupled to a network interface 220 to exchange packets with other network devices by inbound link 222 and outbound link 224. Control unit 202 may include one or more processors (not shown in FIG. 3) that execute software instructions, such as those used to define a software or computer program, stored to a computer-readable storage medium (again, not shown in FIG. 3), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 202 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 202 provides an operating environment for network services applications 204, path computation element 212, and MRT management module 208. In one example, these modules may be implemented as one or more processes executing on one or more virtual machines of one or more servers. That is, while generally illustrated and described as executing on a single controller 200, aspects of these modules may be delegated to other computing devices.

MRT management module 208 of controller 200 communicates via network interface 220 to direct ingress devices 16, egress devices 18, and transit nodes 19 to create and install MRT forwarding state. In so doing, MRT management module 208 can provide the network devices with respective multi-topology identifiers (MT-IDs) to use when advertising labels (e.g., by sending LDP label map messages) for setting up LSPs along the set of maximally redundant trees. MRT management module 208 may provide two sets of multi-topology identifiers; one for use with a first set of MRTs and another for use with a second, updated set of MRTs that the network devices may compute after the topology change. MRT management module 208 may store the MT-IDs in MRT state 210.

Ingress devices 16, egress devices 18, and transit nodes 19 can notify controller 200, and MRT management module 208 of controller 20 may receive this notification via network interface 220. MRT management module 208 may store an indication of which network devices have updated the state to MRT state 210.

Once MRT management module 208 of controller 20 has determined that confirmation has been received from each of the ingress devices 16, egress devices 18, and transit nodes 19 of network 22 from which it was expected to be, MRT management module 208 may delete the old MRT forwarding state from each of the network devices, e.g., by accessing the routing information base (e.g., RIB 50 in the control plane 70) of each of the network devices using network interface 220, and modifying entries of the RIB to remove the old MRT forwarding state. In some examples, MRT management module 208 may access, FIB 52, and/or LFIB 62 in the data plane 68 of the network devices to delete the old MRT state.

Also once MRT management module 208 of controller 20 has determined that confirmation has been received from each of the ingress devices 16, egress devices 18, and transit nodes 19 of network 22 from which it was expected to be received, MRT management module 208 instructs the ingress devices 16 to begin forwarding traffic on the new, updated MRTs using the new forwarding state that was confirmed to be installed on all of the network devices. MRT management module 208 may re-purpose the old MT-IDs from the old MRTs for use with other future MRTs that may later be computed.

Network services applications 204 represent one or more processes that provide services to clients of a service provider network that includes controller 200 to manage connectivity in the path computation domain. Network services applications 204 may provide, for instance, include Voice-over-IP (VoIP), Video-on-Demand (VOD), bulk transport, walled/open garden, IP Mobility Subsystem (IMS) and other mobility services, and Internet services to clients of the service provider network. Networks services applications 204 may require services provided by path computation element 212, such as node management, session management, and policy enforcement. Each of network services applications 204 may include client interface 206 by which one or more client applications request services. Client interface 206 may represent a command line interface (CLI) or graphical user interface (GUI), for instance. Client 206 may also, or alternatively, provide an application programming interface (API) such as a web service to client applications.

In some examples, network services applications 204 may issue path requests to path computation element 212 to request paths in a path computation domain controlled by controller 200. Path computation element 212 accepts path requests from network services applications 204 to establish paths between the endpoints over the path computation domain. Path computation element 212 reconciling path requests from network services applications 204 to multiplex requested paths onto the path computation domain based on requested path parameters and anticipated network resource availability.

To intelligently compute and establish paths through the path computation domain, path computation element 212 includes topology module 216 to receive topology information describing available resources of the path computation domain, including ingress devices 16, egress devices 18, and transit nodes 19, interfaces thereof, and interconnecting communication links.

Path computation module 214 of path computation element 212 may compute requested paths through the path computation domain. In general, paths are unidirectional. Upon computing paths, path computation module 214 may schedule the paths for provisioning by path provisioning module 218. A computed path includes path information usable by path provisioning module 218 to establish the path in the network. Provisioning a path may require path validation prior to committing the path to provide for packet transport.

Figure 4:
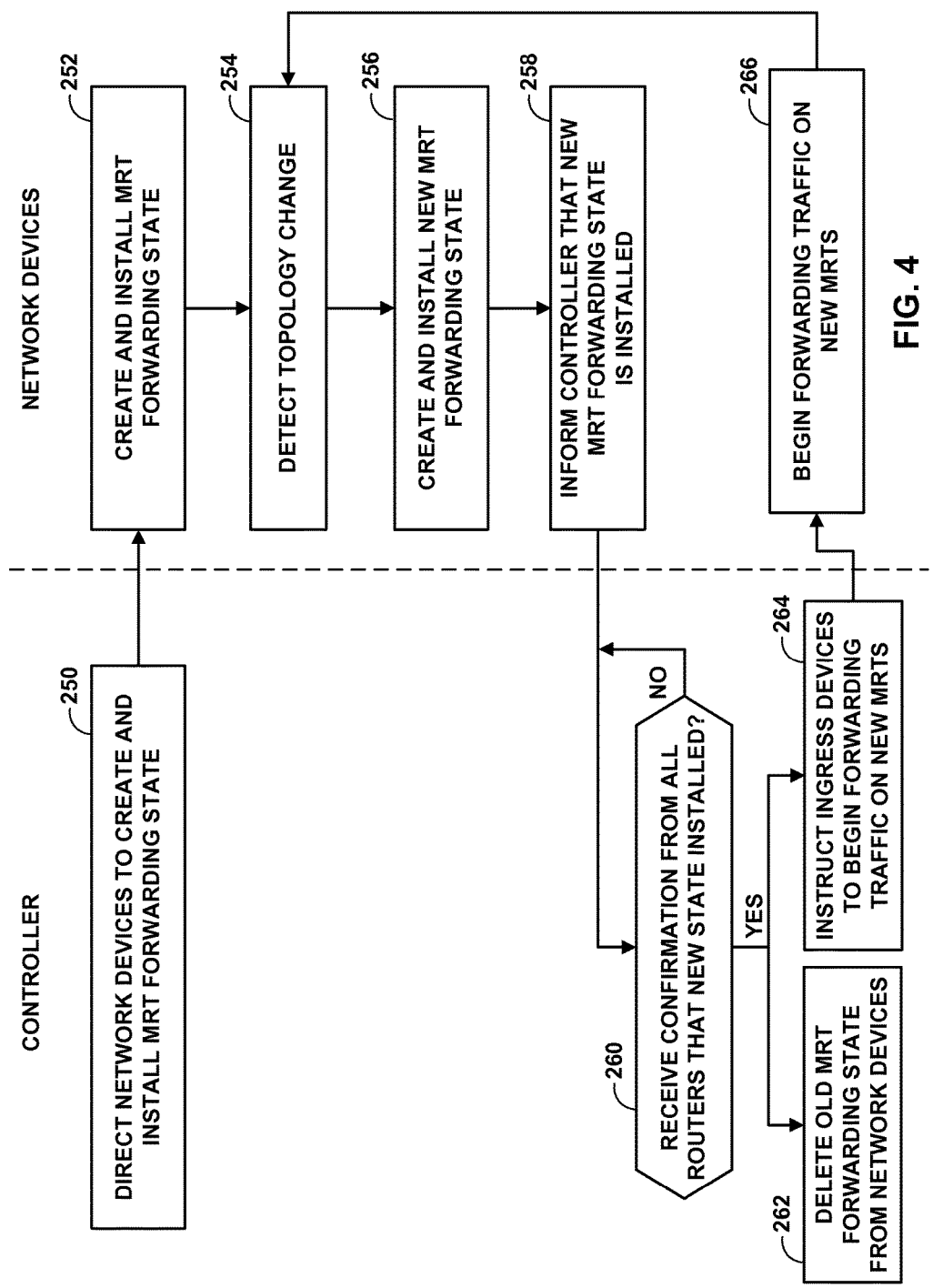
FIG. 4 is a flowchart illustrating exemplary operation of network devices in accordance with the techniques of this disclosure.

FIG. 4 is a flowchart illustrating exemplary operation of a network device in accordance with the techniques of this disclosure. For purposes of example, FIG. 4 will be explained with reference to devices 16, 18, and transit nodes 19 of FIG. 1 and network device 40 of FIG. 2.

MRT management module 208 of controller 20 communicates via network interface 220 to direct ingress devices 16, egress devices 18, and transit nodes 19 to create and install MRT forwarding state (250). Ingress devices 16, egress devices 18, and transit nodes 19 will receive the instructions from controller 20, and will create and install the MRT forwarding state in response (252). For example, each of ingress devices 16, egress devices 18, and transit nodes 19 may each compute, in a distributed fashion using a common algorithm, a pair of MRTs based on the current network topology. The ingress devices 16, egress devices 18, and transit nodes 19 will obtain the same pair of MRTs from the computation, and will advertise labels to their LDP peers for reaching the destination (root) of the MRTs via MRT-red and MRT-blue, and install in forwarding information the labels and next hops for sending traffic toward the destination via MRT-red and MRT-blue. In this manner, LSPs 26 are set up in network 22 along the MRTs. For example, LSP 26A may follow the red MRT and LSP 26B may follow the blue MRT.

One or more of ingress devices 16, egress devices 18, and transit nodes 19 may detect a change to the topology of network 22 (254), e.g., a link or node failure, or, in case of multicast, a change to a multicast receiver. Responsive to detecting the topology change, a device local to the change may begin forwarding network traffic on the other color MRT in the first pair of MRTs. Once aware of the topology change, ingress devices 16, egress devices 18, and transit nodes 19 can re-compute the pair of MRTs based on a modified network graph reflecting the topology change, while traffic is still being received in the meantime by receiver device 14 via the one MRT path that is still working of the first set of MRTs. Respective MRT modules 60 of ingress devices 16, egress devices 18, and transit nodes 19 can then create and install new forwarding state based on the updated, re-computed MRTs (256). Upon installing the new forwarding state based on the updated, re-computed MRTs, each of ingress devices 16, egress devices 18, and transit nodes 19 can individually notify controller 20 that the updated MRT forwarding state has been installed (258). For example, controller communication module 72 of each of ingress devices 16, egress devices 18, and transit nodes 19 can notify controller 20, and MRT management module 208 of controller 20 may receive this notification via network interface 220. MRT management module 208 may store an indication of which network devices have updated the state to MRT state 210.

Once MRT management module 208 of controller 20 has determined that confirmation has been received from each of the ingress devices 16, egress devices 18, and transit nodes 19 of network 22 from which it was expected to be received (YES branch of 260), MRT management module 208 may delete the old MRT forwarding state from each of the network devices (262), e.g., by accessing the routing information base (e.g., RIB 50 in the control plane 70) of each of the network devices using network interface 220, and modifying entries of the RIB to remove the old MRT forwarding state.

Also once MRT management module 208 of controller 20 has determined that confirmation has been received from each of the ingress devices 16, egress devices 18, and transit nodes 19 of network 22 from which it was expected to be received (YES branch of 260), MRT management module 208 instructs the ingress devices 16 to begin forwarding traffic on the new, updated MRTs using the new forwarding state that was confirmed to be installed on all of the network devices (264). Ingress devices 16 will begin forwarding traffic on the LSPs 26 associated with the new MRTs (266). MRT management module 208 and MRT module 60 (FIG. 2) may re-purpose the old MT-IDs from the old MRTs for use with other future MRTs that may later be computed.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:
1. A method comprising:
  receiving, by a centralized controller of a network, an indication from each of a plurality of network devices confirming that each of the plurality of network devices has installed forwarding state associated with an updated set of maximally redundant trees that were computed based on an updated network graph responsive to a change in topology of the network, wherein the updated set of maximally redundant trees replaces a first set of maximally redundant trees that were computed based on a network graph representing the network prior to the change in topology, wherein the first set of maximally redundant trees and the updated set of maximally redundant trees each comprise a set of spanning trees, and wherein the first set of maximally redundant trees and the updated set of maximally redundant trees are each computed for concurrently sending redundant data traffic on each maximally redundant tree of the respective set from at least one ingress network device to at least one egress network device of the network;

confirming, by the centralized controller, that the indication has been received from each of the plurality of network devices from which confirmation is needed; and in response to confirming that the indication has been received from each of the plurality of network devices from which confirmation is needed, and by the centralized controller:

instructing one or more ingress network devices of the plurality of network devices to begin forwarding network traffic according to the forwarding state associated with the updated set of maximally redundant trees, and removing, by the centralized controller, from a routing information base of each of the network devices, forwarding state associated with the first set of maximally redundant trees.

2. The method of claim 1, wherein the forwarding state associated with the first set of maximally redundant trees comprises a first set of Multi-Protocol Label Switching (MPLS) labels for a first set of label switched paths (LSPs) along paths of the first set of maximally redundant trees, wherein each of the first set of MPLS labels is associated with a forwarding equivalence class (FEC), and wherein each of the first set of MPLS labels is associated with a respective multi-topology identifier that identifies one of the maximally redundant trees of the first set of maximally redundant trees, and wherein the forwarding state associated with the updated set of maximally redundant trees comprises a second set of MPLS labels for a second set of label switched paths (LSPs) along paths of the updated set of maximally redundant trees, wherein each of the second set of MPLS labels is associated with the FEC, and wherein each of the second set of MPLS labels is associated with a different respective multi-topology identifier that identifies one of the maximally redundant trees of the second set of maximally redundant trees.

3. The method of claim 2, further comprising:

providing, by the centralized controller and to the plurality of network devices, the respective multi-topology identifiers, wherein the respective multi-topology identifiers include a first set of multi-topology identifiers, each multi-topology identifier of the first set of set of multi-topology identifiers for identifying a different maximally redundant tree of the first set of maximally redundant trees, and wherein the respective multi-topology identifiers include a second set of multi-topology identifiers, each multi-topology identifier of the second set of set of multi-topology identifiers for identifying a different maximally redundant tree of the second set of maximally redundant trees.

4. The method of claim 1, further comprising:

by the centralized controller, detecting the change in topology of the network yielding a modified network graph; and by the centralized controller, computing the updated set of maximally redundant trees based on the modified network graph; and by the centralized controller, instructing the plurality of network devices to each of the plurality of network devices along at least one of the second set of maximally redundant trees to install forwarding state to form a plurality of label switched paths (LSPs) from at least one ingress network device to at least one egress network device along the second set of maximally redundant trees.

5. The method of claim 1, wherein the indication specifies a network topology on which the updated set of maximally redundant trees was computed by the respective network device of the plurality of network devices from which the indication is received.

6. The method of claim 5, wherein the indication specifies the network topology by including at least an indication of a link state advertisement (LSA) received by the network device that triggered computation of the updated set of maximally redundant trees.

7. The method of claim 1, wherein first set of maximally redundant trees and the updated set of maximally redundant trees each comprises a pair of spanning trees that share a least number of links possible and share a least number of nodes possible.

8. The method of claim 1, wherein removing the forwarding state comprises:

accessing the routing information base of each of the network devices via an interface to a control plane of the respective network device; and modifying entries of the routing information base of each of the network devices.

9. The method of claim 1, wherein the first set of maximally redundant trees and the updated set of maximally redundant trees are computed for sending unicast traffic from the at least one ingress network device to the at least one egress network device of the network.

10. The method of claim 9, wherein the first set of maximally redundant trees and the updated set of maximally redundant trees each comprise a pair of spanning trees rooted at the at least one egress network device.

11. The method of claim 1, wherein the first set of maximally redundant trees and the updated set of maximally redundant trees are computed for sending multicast traffic from the at least one ingress network device to a plurality of egress network devices of the network, wherein the first set of maximally redundant trees and the updated set of maximally redundant trees each comprise a pair of spanning trees to the plurality of egress network devices rooted at the ingress network device.

12. A network device of a network, the network device comprising:

one or more hardware-based processors; and a maximally redundant tree management component executing on the one or more processors, wherein the maximally redundant tree management component is configured to receive an indication from each of a plurality of network devices confirming that each of the plurality of network devices has installed forwarding state associated with an updated set of maximally redundant trees that were computed based on an updated network graph responsive to a change in topology of the network, wherein the updated set of maximally redundant trees replaces a first set of maximally redundant trees that were computed based on a network graph representing the network prior to the change in topology, wherein the first set of maximally redundant trees and the updated set of maximally redundant trees each comprise a set of spanning trees, and wherein the first set of maximally redundant trees and the updated set of maximally redundant trees are each computed for concurrently sending redundant data traffic on each maximally redundant tree of the respective set from at least one ingress network device to at least one egress network device of the network,
wherein the maximally redundant tree management component is configured to confirm that the indication has been received from each of the plurality of network devices from which confirmation is needed, and, responsive to confirming that the indication has been received from each of the plurality of network devices from which confirmation is needed:
  instruct one or more ingress network devices of the plurality of network devices to begin forwarding network traffic according to the forwarding state associated with the updated set of maximally redundant trees, and
  remove, from a routing information base of each of the network devices, forwarding state associated with the first set of maximally redundant trees.

13. The network device of claim 12, wherein the forwarding state associated with the first set of maximally redundant trees comprises a first set of Multi-Protocol Label Switching (MPLS) labels for a first set of label switched paths (LSPs) along paths of the first set of maximally redundant trees, wherein each of the first set of MPLS labels is associated with a forwarding equivalence class (FEC), and wherein each of the first set of MPLS labels is associated with a respective multi-topology identifier that identifies one of the maximally redundant trees of the first set of maximally redundant trees,
and wherein the forwarding state associated with the updated set of maximally redundant trees comprises a second set of MPLS labels for a second set of label switched paths (LSPs) along paths of the updated set of maximally redundant trees, wherein each of the second set of MPLS labels is associated with the FEC, and wherein each of the second set of MPLS labels is associated with a different respective multi-topology identifier that identifies one of the maximally redundant trees of the second set of maximally redundant trees.

14. The network device of claim 12, wherein the maximally redundant tree management module provides the respective multi-topology identifiers to the plurality of network devices, wherein the respective multi-topology identifiers include a first set of multi-topology identifiers, each multi-topology identifier of the first set of set of multi-topology identifiers for identifying a different maximally redundant tree of the first set of maximally redundant trees, and wherein the respective multi-topology identifiers include a second set of multi-topology identifiers, each multi-topology identifier of the second set of set of multi-topology identifiers for identifying a different maximally redundant tree of the second set of maximally redundant trees.

15. The network device of claim 12, wherein the maximally redundant tree management module is configured to detect the change in topology of the network yielding a modified network graph, compute the updated set of maximally redundant trees based on the modified network graph, and instruct the plurality of network devices to each of the plurality of network devices along at least one of the second set of maximally redundant trees to install forwarding state to form a plurality of label switched paths (LSPs) from at least one ingress network device to at least one egress network device along the second set of maximally redundant trees.

16. The network device of claim 12, wherein the indication specifies a network topology on which the updated set of maximally redundant trees was computed by the respective network device of the plurality of network devices from which the indication is received.

17. The network device of claim 12, wherein the indication specifies a network topology by including at least an indication of a link state advertisement (LSA) received by the network device that triggered computation of the updated set of maximally redundant trees.

18. The network device of claim 12, wherein first set of maximally redundant trees and the updated set of maximally redundant trees each comprises a pair of spanning trees that share a least number of links possible and share a least number of nodes possible.

19. The network device of claim 12, wherein the maximally redundant tree management module removes the forwarding state at least in party by accessing the routing information base of each of the network devices via an interface to a control plane of the respective network device, and modifying entries of the routing information base of each of the network devices.

20. A non-transitory computer-readable storage medium comprising instructions for causing a programmable processor of a network device to:
  install, to a routing information base of the network device, first forwarding state associated with a first set of maximally redundant trees computed based on a network graph representing a network;
  forward network traffic according to the first forwarding state;
  install, to the routing information base, second forwarding state associated with an updated set of maximally redundant trees that were computed based on an updated network graph responsive to a change in topology of the network, wherein the updated set of maximally redundant trees replaces the first set of maximally redundant trees,
  wherein the first set of maximally redundant trees and the updated set of maximally redundant trees each comprise a set of spanning trees, and wherein the first set of maximally redundant trees and the updated set of maximally redundant trees are each computed for concurrently sending redundant data traffic on each maximally redundant tree of the respective set from at least one ingress network device to at least one egress network device of the network;
  send, by the network device, to a centralized controller separate from the network device, an indication confirming that the network device has installed the second forwarding state associated with the updated set of maximally redundant trees, wherein the indication specifies a network topology on which the updated set of maximally redundant trees was computed by the respective network device of the plurality of network devices from which the indication is received;
  receive, from the centralized controller, instructions to begin forwarding network traffic according to the second forwarding state associated with the updated set of maximally redundant trees; and
  receive, from the centralized controller, instructions to remove, from the routing information base of the network device, forwarding state associated with the first set of maximally redundant trees.

21. A method comprising:
  installing, by a network device of a network, first forwarding state associated with a first set of maximally redundant trees computed based on a network graph representing the network;

forwarding network traffic according to the first forwarding state;

installing, by the network device, second forwarding state associated with an updated set of maximally redundant trees that were computed based on an updated network graph responsive to a change in topology of the network, wherein the first set of maximally redundant trees and the updated set of maximally redundant trees each comprise a set of spanning trees, and wherein the first set of maximally redundant trees and the updated set of maximally redundant trees are each computed for concurrently sending redundant data traffic on each maximally redundant tree of the respective set from at least one ingress network device to at least one egress network device of the network;

sending, by the network device to a centralized controller separate from the network device, an indication confirming that the network device has installed the second forwarding state, wherein the indication specifies a network topology on which the updated set of maximally redundant trees was computed by the respective network device of the plurality of network devices from which the indication is received;

receiving, from the centralized controller, instructions to begin forwarding network traffic according to the second forwarding state associated with the updated set of maximally redundant trees; and receiving, from the centralized controller, instructions to remove, from a routing information base of the network device, forwarding state associated with the first set of maximally redundant trees.

22. The method of claim 21, wherein the indication specifies the network topology by including at least an indication of a link state advertisement (LSA) received by the network device that triggered computation of the updated set of maximally redundant trees.

23. The method of claim 21, wherein first set of maximally redundant trees and the updated set of maximally redundant trees each comprises a pair of spanning trees that share a least number of links possible and share a least number of nodes possible.

\* \* \* \* \*

UNITED STATES PATENT AND TRADEMARK OFFICE
CERTIFICATE OF CORRECTION

PATENT NO. : 9,571,387 B1
APPLICATION NO. : 14/015613
DATED : February 14, 2017
INVENTOR(S) : Alia K. Atlas and Robert W. Kebler Page 1 of 1

It is certified that error appears in the above-identified patent and that said Letters Patent is hereby corrected as shown below:

In the Claims

Column 21, Line 48 (Claim 3): Replace "identifier of the first set of set of" with --identifier of the first set--

Column 21, Line 54 (Claim 3): Replace "second set of set of multi-topology" with --second set of multi-topology--

Column 23, Line 44 (Claim 14): Replace "identifier of the first set of set of" with --identifier of the first set of--

Column 23, Line 49 (Claim 14): Replace "multi-topology identifier of the second set of set of" with --multi-topology identifier of the second set of--

Signed and Sealed this
Twenty-fourth Day of July, 2018

Andrei Iancu
*Director of the United States Patent and Trademark Office*